Feb. 10, 1970  A. DE PAULA  3,494,634
RETRACTABLE STEP ASSEMBLY
Filed April 24, 1969  2 Sheets-Sheet 2
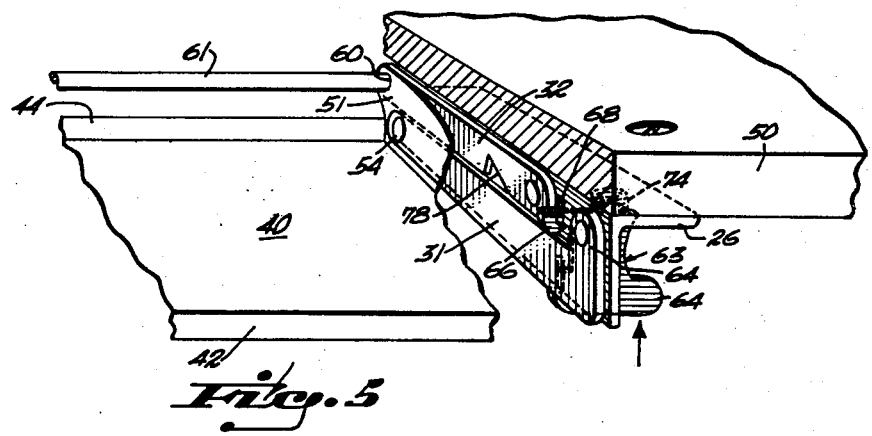
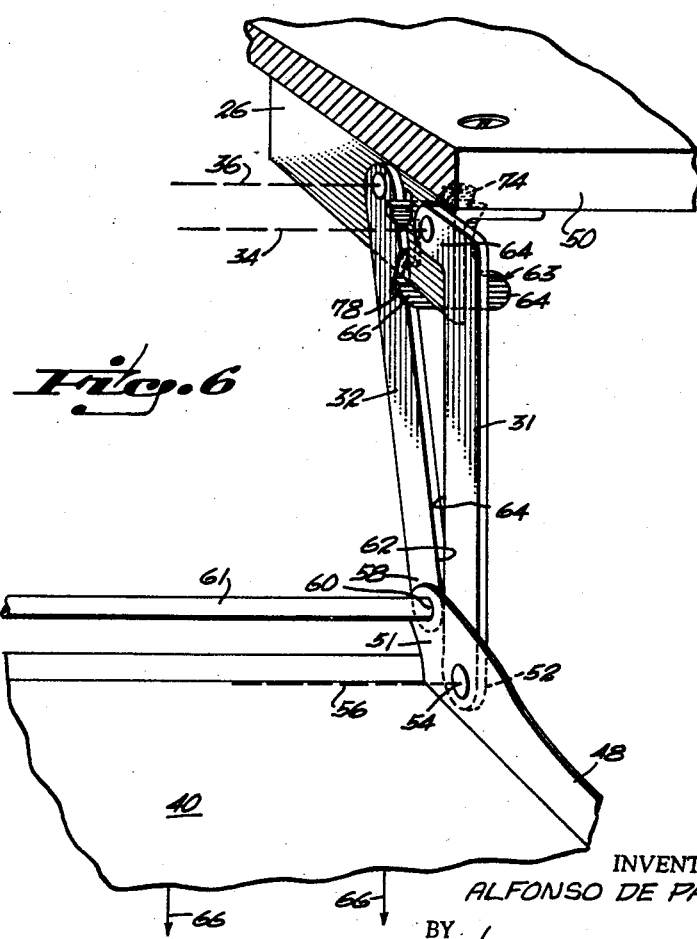
INVENTOR.
ALFONSO DE PAULA
BY
ATTORNEY.

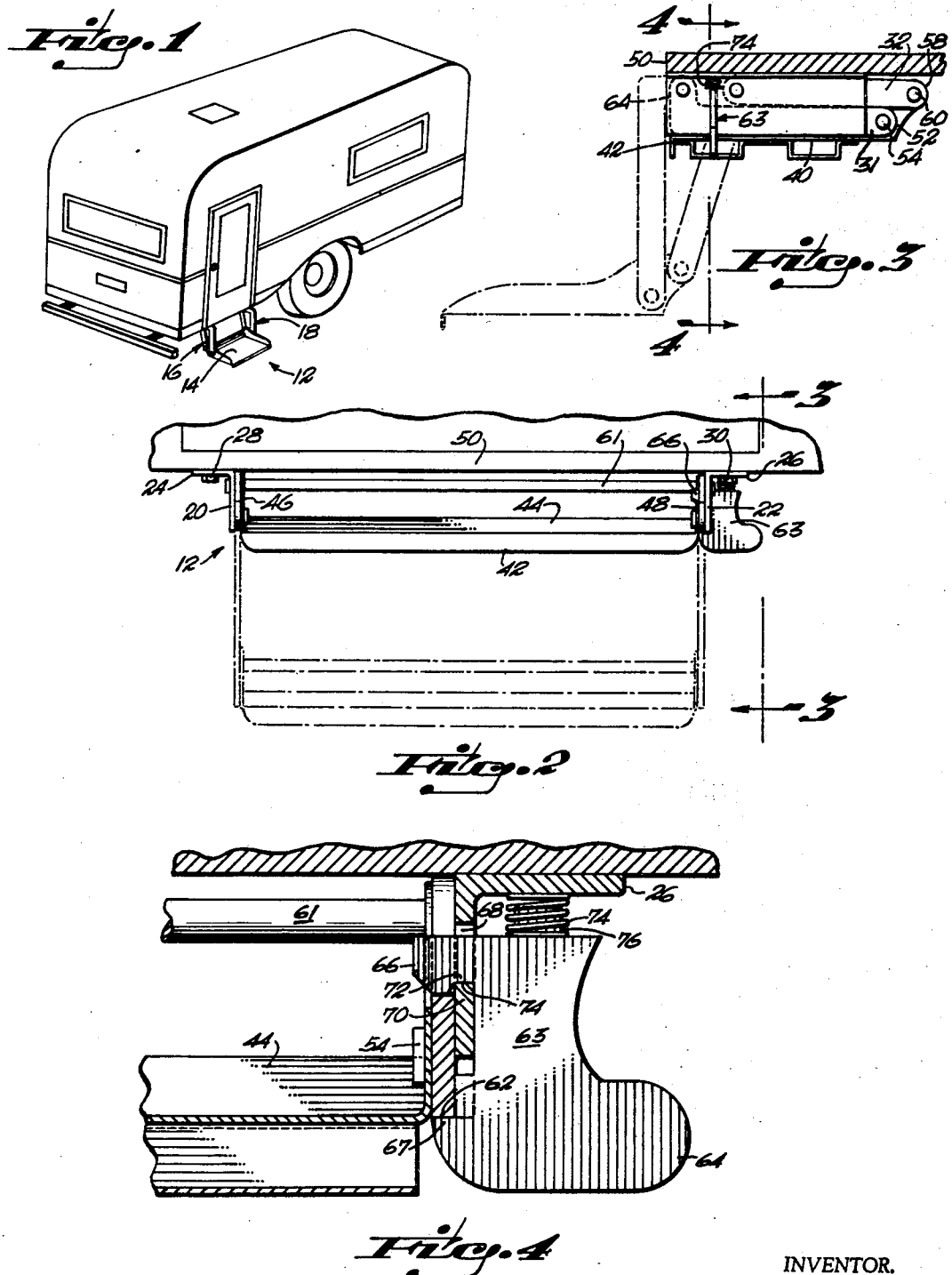

United States Patent Office 3,494,634
Patented Feb. 10, 1970

3,494,634
RETRACTABLE STEP ASSEMBLY
Alfonso De Paula, Opalocka, Fla., assignor of fifty percent to Em Roc Inc., Miami Beach, Fla., a corporation of Florida
Filed Apr. 24, 1969, Ser. No. 818,904
Int. Cl. B60r 3/02
U.S. Cl. 280—166            7 Claims

ABSTRACT OF THE DISCLOSURE

For attachment beneath the edge of the bed of a wheeled vehicle which is adapted to be stored in a compact position with the step in a horizontal attitude underlying the edge of the bed when not in use and to extend to a position for use with the step in a horizontal attitude below and extending outwardly from the edge of the trailer. Support means are provided for the step assembly to effect the compact storage area with a minimum number of links and pivots, the support including opposing pairs of arms with each pair including a strut arm and a swing arm and defining a tilt axis for the step and a tilt limit axis arranged such that the strut axis abuts the swing arms positioning the strut arm as a base and toggle link supporting the step in a horizontal attitude in use, yet yieldable to lift forces when simultaneously coupled with a tangential, horizontal force on the step tending to move it into the retracted position for movement of the step into storage.

---

This invention relates to a retractable step of the type which is particularly useful for use on track campers and trailers and which is adapted to collapse and fold into a compact relation beneath the under surface of the vehicle and which does not project beyond the width of the trailer or vehicle.

It is a major object of this invention to provide an improved step which is especially useful for mounting on trailers for use in camping. The present invention provides an improved step which is adapted to be safely, quickly and easily operated by swinging it from a position of compact storage in substantial horizontal relation underlying the bed of a trailer to an extended position for use as a step with a tread portion extending outwardly from a connection at a swing arm substantially beneath the edge of the bed to which it is mounted; it is also an object of this invention to provide an improved, compact, easily stored step which can be easily operated by simple touch of the foot or finger and which includes a releasable lock means to hold the step in a stored position and which includes a spring biasing detent means for holding the same in a retracted position.

In the past, there have been numerous types of retractable steps; however, it is important that steps be provided which are adapted for a snug, compact storage when in a retracted position and yet when extended are in a strong, sturdy supported condition with a minimum number of parts. A multiple step assembly, for instance, is shown in U.S. Letters Patent 2,575,615 which includes, however, an increased number of arms, links and axes co-operating to interconnect the step and the trailer bed for swinging movement. Another retractable step is to be found in U.S. Letters Patent 2,436,961, but which, however, is not adapted to be stored in a tight, compact unit with the step in a horizontal attitude underlying the bed and which includes additional parts not necessary or required by the structure disclosed herein which is characterized by a strut arm which is connected to the step so as to define a particularly important limit to the tilt which can be achieved by the step in response to a downward vertical force without the requirement of an additional stop pin or limit means.

In accordance with these and other objects which will become apparent hereinafter, the instant invention will now be described with reference to the accompanying drawings in which:

FIGURE 1 is a perspective view of a trailer with the present invention installed thereupon;
FIGURE 2 is an elevation view of the lower portion of FIGURE 1 and with the step in a retracted position;
FIGURE 3 is a view in cross section taken along the plane indicated by the line 3—3 of FIGURE 2 and looking in the direction of the arrows;
FIGURE 4 is an enlarged view of the right-hand portion of FIGURE 3;
FIGURE 5 is a partial perspective and broken away view illustrating the instant invention in a retracted position;
FIGURE 6 is a view similar to FIGURE 5 and illustrating the step in an extended position with the strut arm interengaging the swing arm of the step so as to lock it against rotation toward the stored position when a weight is applied vertically on the step as indicated by the arrows.

Referring to the drawings, wherein like reference characters designate like or corresponding parts throughout the different views, the step assembly is generally designated by the numeral 12. It is seen to comprise a step portion 14 carried at the ends of two opposing pairs of support arms 16 and 18, with each of the pairs being connected pivotally at their upper ends to a pair of spaced rails 20 and 22, each of which includes a horizontal flange 24 and 26 through which headed bolts 28 and 30 are provided to secure the step assembly to the under side of the bed of a wheeled vehicle.

Referring to the rails, each extends across the under surface of the bed from the edge a common distance. To the outboard end of each of these rails, the opposing pairs of support arms 16 and 18 are pivotally connected, each being composed of a swing arm 31 and a strut arm 32, each of which is pivotally connected to the outboard end of a rail with the swing arm and the strut arm of each pair being in opposing relation to their respective counter parts on the opposing rail. As seen in FIGURE 6, the connection of the swing arms 31 to the rail defines a first swing axis indicated by the line 34 and the connection of the strut arms 32 to the rail is just inboard of the first swing axis and defines a second swing axis 36 parallel to and just inboard of axis 34. To the distal end of the pairs of support arms, a step having a tread portion 40 with a leading edge 42 and a trailing edge 44 and opposite side wall portions 46 and 48, is pivotally connected. When the swing arms are in the vertical or extended position and the step is in the horizontal attitude, the trailing edge is substantially directly below the edge 50 of the bed to which it is adapted to be attached. The end 52 of the swing arms connect to the proximal portion of an upwardly and rearwardly extending portion 51 of the side walls, in a pivot connection as at 54, and these connections of the opposing arms define an axis of tilt 56 about which the step is free to be tilted into and out of a horizontal attitude, which is shown in FIGURE 6. The distal end 58 of the strut arms are connected in a pivot connection 60 rearwardly and upwardly of the pivots 54, that is, to the distal portion of the extending portion 51. The strut arms are sized so that, when the tread 40 is in the horizontal attitude shown in FIGURE 6, the face 62 of the strut arm abuts the confronting face 64 of the swing arm and prevents rotation in response to downwardly directed weight forces indicated by the arrow 66 on the tread by jambing together in abutting relation to lock the step against rotation into vertical alignment and, with equal effect, to brace the step against rearward rotation about the swing axes. It is seen that the length of the strut arm between the second swing axis 36 and the tilt limit axis, that is, the axis through the pivot connection 60 of the strut arm and the extending portion 51, which is the centerline of the member 61, is such that a line connecting the tilt axis and the inboard swing axis 36 does not pass through the tilt limit axis and that locking will take place except in response to a slight upward force on the leading edge 42 of the tread to rotate the tilt limit axis so that the end of the strut arm is not in abutting engagement with the end portion of the swing arm. Of course, as the tilt limit axis is thus rotated about the tilt axis, the entire assembly may be moved into the retracted position, shown in FIGURES 3 and 5, by simultaneously applying a tangential force, i.e., horizontal, inwardly directed force on the leading edge 42 of the tread portion.

Means are provided to hold the step in a retracted position when it is swung into the compact position shown in FIGURE 3 with the swing arm and the strut arm in the generally stacked relation which is effected by the L-shaped configuration of the swing arm with the shorter leg 64 being spaced from the swing axis 34 in distance just slightly greater than the width of the strut arm. The holding means, which is seen in FIGURE 4, includes a key member 63 having an operator portion 64, a hook-shaped portion 66 by which it is supported in part, and a latch portion 67. The hook-shaped portion is trapped in a slot 68 in the downwardly extending portion 70 of one of the rails with the bite 72 of the hook engaging the side wall 74 of the slot 68. The latch portion 67 extends into the path of travel of the support arms and is adapted to hook under the face 62 of the strut arm in the preferred embodiment shown for the purpose of holding it in the retracted position against gravity forces. A spring 74, coiled on a pin 76, on the key holds the key in the normal latched position shown in FIGURE 4, yet clearance is provided to tilt the key storing energy in the spring so as to release the latch portion from engagement with the strut so that the step assembly will lower into the position for use. In the preferred embodiment, the face 62 of the strut is provided with a notch 78 to receive the latch portion when the step assembly is in the extended position shown in FIGURE 6 and positioned so that the hook portion abuts the same face of the strut and tending to limit movement of the step when in an extended position outwardly beneath the edge.

In the preferred construction, suitable bars and stock material may be used together with rivets and other pivot means. The safety locking device disclosed is the preferred device to secure the step assembly in the retracted position beneath the edge of the bed to which it is mounted and in which position it is stored in a compact, collapsed condition.

What is claimed is:
1. For attachement in depending relation at one end of the bed of a wheeled trailer;
  a step assembly comprising:
    a first rail and a second rail in spaced, parallel relation and adapted to be secured to the underside of the bed with the first end of each of the rails at about the edge of said bed and with the other end of each of the rails being spaced away from the edge of said bed, and means to secure the rails to said bed;
    a step having a tread portion with a leading edge, a trailing edge, and opposite side wall portions extending upwardly and rearwardly from the main plane of the tread at the trailing edge;
    a first pair of support arms and a second pair of support arms, each of said pairs including a swing arm and a strut arm and each of said swing arms and each of said strut arms being of a common length,
    first pivot means connecting one end of the swing arm of each pair to the first end of said first rail and connecting one end of the swing arm of the second pair to the first end of the second rail, said first pivot means defining a first swing axis extending between said rails at about the edge;
    second pivot means connecting the distal end of the swing arm of said first pair to one of the side wall portions and connecting the distal end of the swing arm of said second pair to the other side wall portion of said step and said second pivot means defining an axis of tilt for the step between the distal ends;
    the weight of said step tending to rotate the step from a first position wherein said step is in a generally horizontal attitude and said swing arms are vertically aligned beneath said edge about said axis of tilt, and said step and swing arms are responsive to swinging movement about the first swing axis from said first position to a second position wherein the swing arms and said step are in both a generally horizontal attitude substantially parallel to and underlying said rails;
    third pivot means connecting one end of the strut arm of said first pair to the first end of said first rail inboard of said first swing axis, and connecting one end of the strut arm of the second pair to the first end of the second rail inboard of said first swing axis, said third pivot means defining a second swing axis across said rails, parallel to an inboard of said first swing axis.
    fourth pivot means conecting the distal end of the strut arm of said first pair to the side wall portion of said step beneath said first rail and at a first point rearwardly and upwardly of said second pivot means, and the distal end of the strut arm of said second pair to the opposite side wall portion of the step beneath said second rail at a second point rearwardly and upwardly of said second pivot means, said fourth pivot means defining a tilt limit axis parallel to and closely spaced rearwardly and upwardly of said tilt axis when said step and swing axis are in said first position and said tread is in a horizontal attitude,
    the length of said strut arms betwen the second swing axis and the tilt limit axis being less than the distance between said second swing axis and said tilt axis, so that a line connecting said tilt axis and the second swing axis does not pass through the tilt limit axis, and the strut arms and swing arms are sized and
    said tilt limit axis is arcuately displaced on a radius from said tilt axis a distance such that the strut arm of each of said pairs abuts the adjacent swing arm of each of said pairs when the step is in said first position, to lock the step in said first position in response to downward forces on the leading edge of said tread tending to tilt said tread out of the horizontal attitude, and
    simultaneously responsive to lift forces on the leading edge of the tread with horizontal forces on said tread tending to rotate said tread beneath said bed about said first swing axis, whereby said step may be retracted to said second position by lifting it on the leading edge and swinging it about said first swing axis into a horizontal attitude underlying said bed for storage, and
    means carried on one of the rails to releasably hold said step in underlying relation of said bed.
2. The step assembly as set forth in claim 1 wherein each of said swing arms is of generally L-shaped construction including a main length and a short leg portion, said short leg portion being of a length slightly greater than the width of said strut arm and said swing axis ex- tending through the terminal portion of said shorter leg portion.

3. The step assembly as set forth in claim 1 wherein said means to releasably hold said step in underlying relation of said bed comprises a latch carried by said rail including spring means normally urging said latch into the path of travel of one of said support arms and yieldable in response to upward forces to permit passage of said support arms and steps into the second position, said latch including a portion having a bite to hook up with said one of said support arms when in the retracted position.

4. The step assembly as set forth in claim 3 wherein each of said swing arms is of generally L-shaped construction including a main length and a short leg portion, said short leg portion being of a length slightly greater than the width of said strut arm and said swing axis extending through the terminal portion of said shorter leg portion.

5. The step assembly as set forth in claim 3 wherein said latch comprises a key member including said latch and an operator portion positioned and accessible at said edge.

6. The step assembly as set forth in claim 5 wherein said key member includes a pin and said spring means constitutes a coiled spring circumposed about said pin and captivated between said key and said rail and normally tilting said key into the latched position.

7. The step assembly as set forth in claim 6 wherein said key member includes a hook portion and said rail includes a verticaly extending portion with a slot and said hook portion being normally captivated in said slot.

References Cited

UNITED STATES PATENTS

| | | | |
|---|---|---|---|
| 2,125,085 | 7/1938 | Pool | 280—166 |
| 2,436,961 | 3/1948 | Gabriel | 280—166 |
| 2,575,615 | 11/1951 | Crump | 280—166 |

LEO FRIAGLIA, Primary Examiner

R. R. SONG, Assistant Examiner

U.S. Cl. X.R.

182—88